Sept. 14, 1965  J. VÖGELE ETAL  3,206,534
METHOD AND APPARATUS FOR LIFTING AND
TRANSPORTING COMPOSITION BLOCKS
Filed Feb. 14, 1962
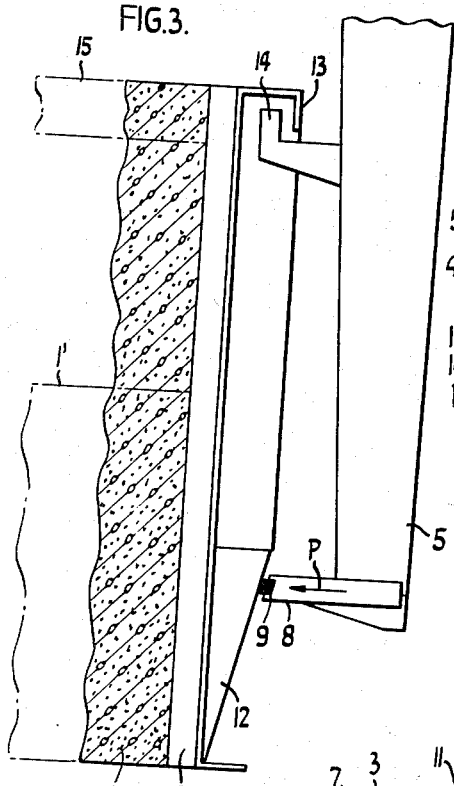
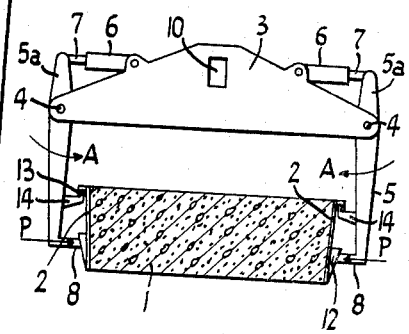
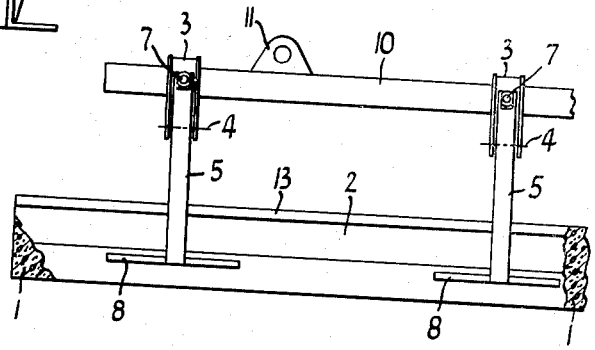
INVENTORS
JOSEF VÖGELE
JOSEF HEBEL
BY
Woodhams Blanchard & Flynn
ATTORNEYS United States Patent Office 3,206,534
Patented Sept. 14, 1965

3,206,534
METHOD AND APPARATUS FOR LIFTING AND TRANSPORTING COMPOSITION BLOCKS
Josef Vögele, Furstenfeldbruck, and Josef Hebel, Memmingen, Germany, assignors to Gasbetonwerk Josef Hebel G.m.b.H., Emmering, near Furstenfeldbruck, Germany, a corporation of Germany
Filed Feb. 14, 1962, Ser. No. 174,356
Claims priority, application Germany, Feb. 14, 1961, G 31,593
5 Claims. (Cl. 264—336)

The invention relates to a method of lifting and transporting composition blocks, more particularly porous concrete blocks in the plastic state. In the manufacture of porous concrete constructional parts, for example slabs, a large composition block is first made, and while still in the plastic state, this block is cut up on a cutting machine into constructional parts, for example slabs. In doing this, the composition block made by casting in a mould must be lifted in the still plastic state and transported to the table of a cutting machine. For this purpose, for the lifting transport of the compositon block, it has been proposed to use the casting mould box which, for this purpose, consists of the mould frame or the four side walls and bottom bars or bottom corners fixed on the inside of said frame, on which bars or corners the composition block is supported. These bottom bars, however, form only an insufficient support for the very delicate plastic composition block, so that there is a danger of cracking, especially in the case of blocks of large dimensions. The provision of bottom bars on the mould frame, which form a part of the casting mould bottom, necessitates a special construction of the mould bottom and also of the cutting machine. Due to this construction of the mould box and mould bottom, sealing of the mould is made difficult, as is also the necessary cleaning of the mould, due to the corner formation. The same applies to the machine table. In addition, with this lifting transport of the composititon block with the mould box, the latter has to be taken apart on the machine table. This is not only troublesome but involves the risk of damaging the block, because in view of the bottom bars, the side walls of the mould box have to be lifted off the composition block in the horizontal direction.

The foregoing disadvantages of the known lifting transport of composition blocks are eliminated by means of the invention. By the method according to the invention, a tong-like lifting device is used, by means of which the composition block is pressed so powerfully on two opposite side faces that the gripping force produced by this pressure is sufficient for lifting the composition block. In putting this method into practice, the pressing force may advantageously be applied to the two side walls of the mould, from which the two end walls have been removed after casting the block.

The details and advantages of this new method will be explained in the following with reference to the drawing illustrating a constructional example. In this drawing:

FIGURE 1 shows the front view of a lifting device with composition block;

FIGURE 2 shows the corresponding side view; and

FIGURE 3 shows details of the lifting device of FIGURE 1.

In the drawing, 1 denotes a composition block or porous concrete block, which for example may have a length of 6 metres, a width of 2 metres and a height of say 0.5 metre. According to the invention, the clamping principle is used for the lifting transport of this block in the plastic state, that is to say, pressing plates 2 are pressed so powerfully against the side faces of the composition block by means of a tong-like lifting device that the frictional force produced by this clamping force between block 1 and pressing plates 2 is greater than the actual weight of the block. The composition block 1 is compressed slightly by the pressing forces, which are indicated at P in FIGURE 1 and which are applied mainly in the lower region of the side faces of the block. This deformation, amounting to only a few millimeters, only affects the lateral marginal zones of the composition block, however, and is harmless, since these marginal zones are cut off in the subsequent subdivision of the block into constructional parts.

As indicated in FIGURE 1, advantageously in this lifting transport, a composition block may be used, in which the cross-section is tapered wedge-fashion slightly in the downward direction. The lower width of the composition block, however, is only a few millimetres smaller than the upper width thereof. By this tapering of the composition block downward, a certain wedge action is produced, that is to say, on the application of the pressing plates 2 to the side faces, the composition block will be securely held not only by frictional force, but at the same time also by this wedging action. Consequently, in lifting transport with such a tapered composition block, the pressing force P can be correspondingly reduced. This also applies furthermore, when, as shown by way of example in FIGURE 1, the pressing forces P are applied in the lower region of the side faces. The pressing forces exerted on the composition block by the pressing plates 2 are then greater in the lower region than in the upper region, so that a somewhat stronger deformation of the composition block is produced in the lower region and hence also a certain wedge action.

For carrying out the new method, use is made in the constructional example shown of a lifting device, which is formed of the two above-mentioned pressing plates 2, extending over the entire length of the side faces and advantageously also over the entire height of the composition block, and one or more lifting tongs. These lifting tongs each consist of a cross-head 3, two clamping levers 5 pivoted to its ends at 4, and a driving device by means of which these clamping levers are rocked in the direction A and pressed against the pressing plates 2. In the constructional example shown, the clamping levers 5 are of double-arm construction, and two hydraulic cylinders 6 are mounted on the cross-head 3, the plungers 7 of which cylinders engage the upper lever arms 5a of clamping levers 5. By means of these hydraulic pressure cylinders, therefore, considerable clamping forces P, which may amount to about 2,000 kg. in the case of the abovementioned size of composition block 1, can be exerted on the pressing plates 2.

To transmit these high pressing forces over a greater length of the pressing plates 2, horizontal clamping rails 8 are mounted on the lower ends of the clamping levers 5. To render the transmission of these forces as uniform as possible, a clamping strip 9 of resilient material, for example rubber of suitable hardness, is mounted on each clamping rail 8.

When the composition block is of considerable length, a number of pairs of lifting tongs are provided, as shown, a common lifting girder 10 being mounted for connecting together and carrying the cross-heads 3 of the various lifting tongs. Eyes 11 are provided on the girder 10 for the engagement of a lifting element (chain or rope).

As shown in the drawing, each pressing plate is reinforced, preferably in the lower region, by a bar 12 extending over the entire length of the plate. Advantageously, this bar is tapered downwardly wedge-shaped in cross-section. By this means, when the clamping rails 8 are pressed against this wedge-shaped bar, secure lifting is ensured, and jerky lifting, endangering the block and possibly causing cracking, is prevented.

It is furthermore advantageous to use pressing plates 2 which form the two side walls of the mould used for casting the composition block. After casting, only the two end walls of the mould are removed, so that the side walls 2 remain on the composition block. This has the advantage that, on the one hand, the block is not damaged by the removal of the side walls of the mould and the application of the pressing plates, and on the other hand, the adhesion produced on the casting of the block between the latter and the side walls of the mould supports the lifting of the composition block, since this force of adhesion is added to the frictional force produced by pressing.

After the lifting of the composition block as described hereinbefore and the setting down thereof on the table of a cutting machine, the lateral pressing plates 2 must be removed. For this purpose, there is provided according to the invention on each pressing plate at its upper edge and on the outside an angle rail 13, engaged from below with considerable clearance by lifting hooks 14 provided on the lever arms 5 of the lifting tongs.

FIGURES 1 and 3 shows this arrangement during the lifting operation. As soon as the composition block has been set down on the machine table, the pressing forces P are eliminated, that is to say, the clamping levers 5 are rocked somewhat against the direction of the arrow A, and then the lifting device is raised. The clamping rails 13 bear against the hooks 14 of the clamping arms, so that with this operation, the pressing plates 2 are lifted off and removed from the composition block 1.

The device according to the invention is also suitable for the lifting transport of composition blocks, whose height is less than the height of the pressing plates 2, that is to say, less than the height of the composition block shown in FIGURE 1. Such a composition block of lesser height is indicated at 1' in FIGURE 3. In this case, spacing timbers 15 or the like are arranged at the top between the two pressing plates 2, and receive the pressure of application of the plates 2 in the upper region. In this way, a composition block of small height can be lifted and transported without damage.

The invention is not limited to the lifting device hereinbefore described. The method according to the invention can also be carried out by other means.

What we claim is:

1. A method of casting and transporting a porous concrete block comprising:
pouring a flowable concrete molding composition into a block form to form a block therein, said form having opposed side walls and opposed end walls, said end walls being disconnectable from said side walls;
removing the end walls of said form while the block is in a plastic condition and simultaneously maintaining the side walls in place against the sides of the block so that said side walls remain adhered to the sides of said block and are capable of relatively slight movement toward each other;
while the block is in a plastic condition, pressing clamping means against the outer surfaces of the side walls between the middle and lower edge thereof and thereby urging the lower portions of said side walls toward each other to create a friction force between the block and the side walls which force is greater than the weight of the block so that the block is firmly clamped by said clamping means; and moving the clamping means in unison to transport the block to a point of use.

2. A method according to claim 1, in which the side walls of the form are inclined outwardly, with respect to a vertical plane, in an upward direction so that in addition to the friction force created by the clamping means, the side walls also impose a wedging action on the block.

3. A method of casting a composition block and transporting the block, comprising:
pouring a flowable molding composition into a block form to form a block therein, said form having a pair of opposed side walls and a pair of opposed end walls which are detachably connected together so that the end walls can be removed;
removing the end walls of said form while the block is in a plastic condition and simultaneously maintaining the side walls in place against the sides of the block so that said side walls remain adhered to the sides of said block and are capable of relatively slight movement toward each other;
while the block is in a plastic condition, pressing a pair of clamping rails against the outer surface portions of said side walls between the middle and the lower edge thereof, the pressing forces being applied to the respective outer surface portions in opposite directions transverse to said side walls to urge said side walls toward each other to create a friction force between the block and the side walls which force is greater than the weight of the block;
and moving the clamping rails in unison to transport the block to a point of use.

4. An apparatus for casting a porous concrete block and transporting the block while it is in a plastic condition, the combination comprising:
a casting form for forming said block, said form having a pair of opposed side walls and a pair of opposed end walls, the end walls being disconnectible from said side walls, each of said side walls having on its outer side between the bottom edge and the middle thereof an outwardly facing surface which is inclined outwardly, with respect to a vertical plane, in an upward direction;
a lifting device including at least one tong-like device having arms extending downwardly alongside said side walls, the lower ends of said arms being movable toward and away from each other and having clamping rails attached thereto, said clamping rails extending toward said outwardly facing surfaces for gripping said surfaces whereby said side walls can be lifted in unison; and
means for actuating said arms.

5. An apparatus as defined in claim 4, in which each of said side walls has an angle rail thereon adjacent its upper, outer edge, said arms comprising a pair of clamping levers each of which has a lifting hook secured thereto, said hooks projecting under and normally spaced from said angle rails, whereby when said clamping rails are released from said surfaces and said lifting device is raised said angle rails, whereby when said clamping rails are side walls from the block.

References Cited by the Examiner

UNITED STATES PATENTS

| | | | |
|---|---|---|---|
| 729,939 | 6/03 | Jones | 294—63 XR |
| 922,114 | 5/09 | Elder | 23—41.5 |
| 1,372,861 | 3/21 | Birdsey | 264—336 |
| 1,905,897 | 4/33 | Cahill | 25—121 |
| 1,983,757 | 12/34 | Hick | 264—336 |
| 2,121,450 | 6/38 | Sentrop | 25—41.5 |
| 2,170,706 | 8/39 | Callaghan | 294—63 |
| 2,228,123 | 1/41 | McMurray | 25—130 |
| 2,370,528 | 2/45 | Fontaine | 294—63 XR |
| 2,515,666 | 7/50 | Rice | 294—63 |
| 3,030,138 | 4/62 | Bennett | 294—63 |

ROBERT F. WHITE, *Primary Examiner.*

NELSON M. ELLISON, ALEXANDER H. BRODMERKEL, *Examiners.*

UNITED STATES PATENT OFFICE
CERTIFICATE OF CORRECTION

Patent No. 3,206,534　　　　　　　　　　　　　September 14, 1965

Josef Vögele et al.

It is hereby certified that error appears in the above numbered patent requiring correction and that the said Letters Patent should read as corrected below.

Column 4, line 52, for "said angle rails, whereby when said clamping rails are" read -- said lifting hooks engage said angle rails to remove said --.

Signed and sealed this 22nd day of March 1966.

(SEAL)
Attest:

ERNEST W. SWIDER　　　　　　　　　　　　EDWARD J. BRENNER
Attesting Officer　　　　　　　　　　　　　Commissioner of Patents